United States Patent [19]

Schilling

[11] Patent Number: 5,422,908
[45] Date of Patent: Jun. 6, 1995

[54] PHASED ARRAY SPREAD SPECTRUM SYSTEM AND METHOD

[75] Inventor: Donald L. Schilling, Sands Point, N.Y.

[73] Assignee: InterDigital Technology Corp., Wilmington, Del.

[21] Appl. No.: 155,173

[22] Filed: Nov. 22, 1993

[51] Int. Cl.⁶ .................... H04L 27/30; H01Q 3/00
[52] U.S. Cl. ........................ 375/203; 380/34; 342/368; 342/371; 342/375; 342/378; 342/379; 342/380; 342/383
[58] Field of Search ............. 375/1; 380/34; 342/368, 342/371, 375, 378–384

[56] References Cited

U.S. PATENT DOCUMENTS

| | | | |
|---|---|---|---|
| 4,189,733 | 2/1980 | Malm | 342/368 |
| 4,291,410 | 9/1981 | Caples et al. | 375/1 |
| 4,361,891 | 11/1982 | Lobenstein et al. | 375/1 |
| 4,549,303 | 10/1985 | Gutleber | 375/25 |
| 4,587,661 | 5/1986 | Schiff | 375/1 |
| 4,587,662 | 5/1986 | Langewellpott | 375/1 |
| 4,608,701 | 8/1986 | Burgers et al. | 375/1 |
| 4,800,390 | 1/1989 | Searle | 342/383 |
| 5,081,643 | 1/1992 | Schilling | 375/1 |
| 5,101,501 | 3/1992 | Gilhousen et al. | 455/33.2 |
| 5,107,273 | 4/1992 | Roberts | 342/375 X |
| 5,109,390 | 4/1992 | Gilhousen et al. | 375/1 |
| 5,248,982 | 9/1993 | Reinhardt et al. | 342/375 |

FOREIGN PATENT DOCUMENTS

| | | | |
|---|---|---|---|
| 0531028 | 3/1993 | European Pat. Off. | H04H 3/00 |
| 9210890 | 6/1992 | WIPO | H04J 13/00 |

*Primary Examiner*—Bernarr E. Gregory
*Attorney, Agent, or Firm*—David Newman & Associates

[57] ABSTRACT

A phased array spread spectrum system for maximizing signal strength of a spread-spectrum signal with multipath. A received spread-spectrum signal is delayed with respect to a phased version of the spread-spectrum signal. The delayed spread-spectrum signal is combined with the phased version of the spread-spectrum signal. A magnitude value of the combined signal is compared with a previous-magnitude value. The delay is adjusted in response to the comparison.

29 Claims, 2 Drawing Sheets

PHASED ARRAY SPREAD SPECTRUM SYSTEM AND METHOD

BACKGROUND OF THE INVENTION

The present invention relates to spread-spectrum communications and more particularly to a method and apparatus for enhancing communications by using phased array principles for increasing signal-to-noise ratio for a spread spectrum signal with multipath arriving at a receiver.

DESCRIPTION OF THE RELEVANT ART

Achieving sufficient signal strength when a received signal comes from two paths is a problem when communicating with spread-spectrum modulation in a multipath environment. The received signal from the two paths may have phase cancellation, yielding no reception, or reception with an unacceptable error rate.

SUMMARY OF THE INVENTION

A general object of the invention is an improved system and method for receiving spread-spectrum signals in a multipath environment.

Another object of the invention is to increase the received signal-to-noise ratio or reduce the probability of error of a spread-spectrum signal arriving from two or more paths.

According to the present invention, as embodied and broadly described herein, a phased array spread-spectrum system is provided comprising receiving means, delaying means, combining means, despreading means, generating means, storing means, and comparing means. The receiving means receives a spread-spectrum signal and a phased version of the spread-spectrum signal. Typically, the spread-spectrum signal is received with a first receiver coupled to a first antenna, and the phased version of the spread-spectrum signal is received with a second receiver coupled to a second antenna. The received spread-spectrum signal and the phased version of the spread-spectrum signal are digitized. The delaying means can delay the received spread-spectrum signal with respect to the phase version of the spread-spectrum signal by a delay. The received spread-spectrum signal consequently becomes a delayed signal.

The combining means combines the delayed signal and the phased version of the spread-spectrum signal as a combined signal. An in-phase component of the delayed signal is combined with an in-phase component of the phased version of the spread-spectrum signal. A quadrature-phase component of the delayed signal is combined with a quadrature-phase component of the phased version of the spread-spectrum signal.

The despreading means despreads the combined signal as a despread signal. This may be accomplished using a product detector with a chipping sequence matched to the received spread-spectrum signal, or a matched filter having an impulse function matched to the chipping sequence of the received spread-spectrum signal.

The generating means generates from the despread signal a magnitude value. The magnitude value may be an absolute value, or the square of the in-phase component and quadrature-phase component of the despread signal.

The storing means stores a previous-magnitude value previously generated by the generating means and a present-magnitude value presently generated by the generating means. The previous-magnitude value and the present-magnitude value are compared by the comparing means. In response to this comparison, the comparing means outputs a comparison signal. The delaying means may change the delay based on the comparison signal.

The present invention also includes a method for maximizing the signal strength of a spread-spectrum signal with multipath comprising the steps of receiving the spread-spectrum signal and a phased version of the spread-spectrum signal. The received spread-spectrum signal is delayed with respect to the phased version of the spread-spectrum signal by a delay, to generate a delayed signal. The delayed signal and the phased version of the spread-spectrum signal are combined as a combined signal, and the combined signal is despread as a despread signal.

The method includes generating a magnitude value from the despread signal, and storing a previous-magnitude value and a present-magnitude value. The previous-magnitude value and the present-magnitude value are compared, and a comparison signal is output based on this comparison. Using the comparison signal, the delay is changed. The step of generating the magnitude value is a way of locating a maximum. Other procedures for locating a maximum or equivalent may be used.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention provides a unique phased array spread-spectrum system comprising receiving means, delaying means, combining means, despreading means, generating means, storing means, and comparing means. The delaying means is coupled between the receiving means and the combining means. The despreading means is coupled between the combining means and the generating means. The storing means is coupled between the generating means and the comparing means, and the comparing means is coupled to the delaying means.

Figure 1:
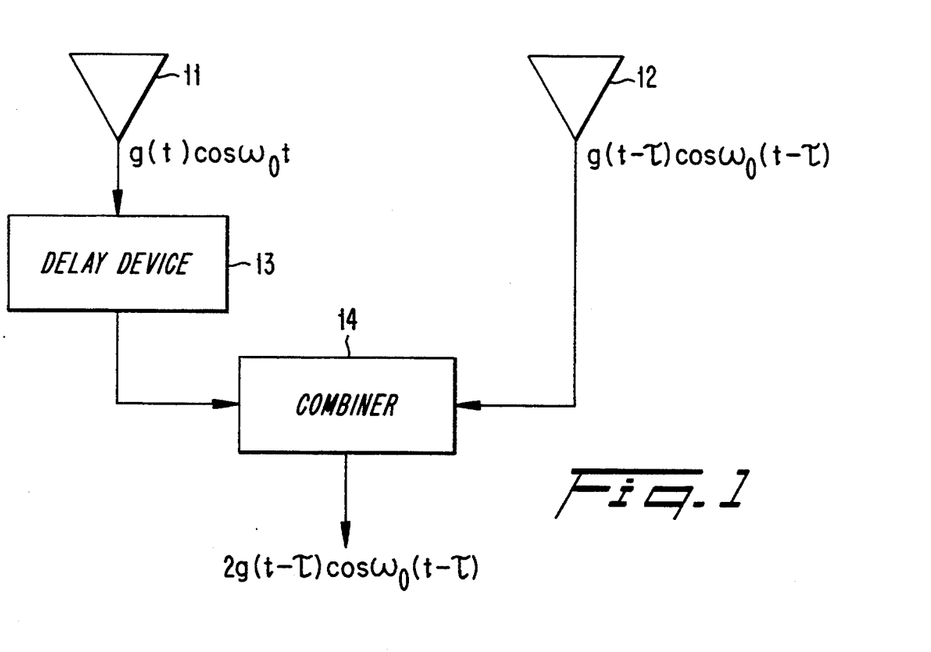
FIG. 1 is a block diagram illustrating the general concept of the invention.
Figure 2:
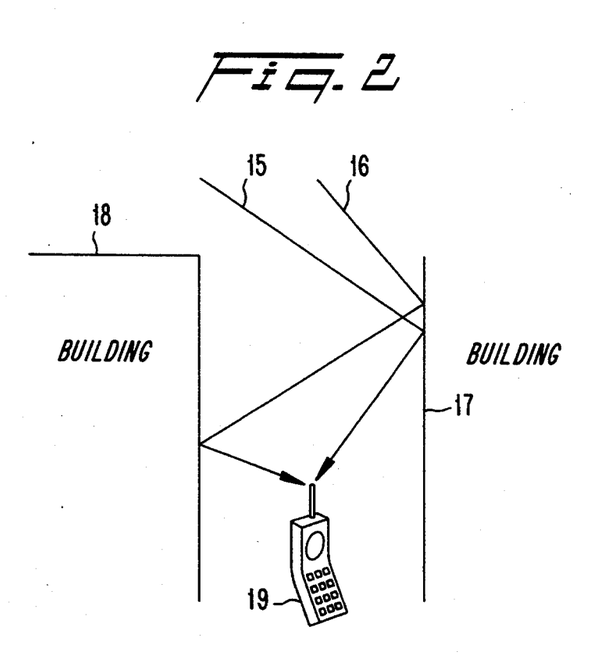
FIG. 2 shows two multipath signals being received by a user.

The receiving means of FIG. 1 receives a spread-spectrum signal and a phased version of the spread-spectrum signal. The term "phased version" as used herein includes a version of the spread-spectrum signal having a phase different from the received spread-spectrum signal, and/or a version of the spread-spectrum signal having a time delay with respect to the received spread-spectrum signal. The different phase and/or time delay arises, as shown in FIG. 2, from the spread-spectrum signal 15 and the phased version of the spread-spectrum signal 16 arriving from different paths, such as bouncing off different buildings 17, 18. The phased array spread-spectrum system may be implemented at a base station or, as shown in FIG. 2, a remote subscriber unit (RSU) such as a handset 19. The phase change occurs upon each reflection, since a first ray 15 has one reflection and a second ray 16 has two reflections. As a result of the difference in time between the two rays, the multipath signals can undergo phase cancellation and cause a fade. The phased array spread-spectrum system of FIG. 1 delays or phase shifts one of the two antennas 11, 12 enough to steer the beam from the two antennas to either building, or ray path having maximum signal strength.

Typically, the receiving means, as shown in FIG. 1, includes a first antenna 11 and a second antenna 12. The spread-spectrum signal $d(t)g(t)\cos\omega_0 t$ is received with a first receiver coupled to a first antenna 11, and the phased version of the spread-spectrum signal $d(t-\tau)g(t-\tau)\cos\omega_0(t-\tau)$ is received with a second receiver coupled to a second antenna 12. The first receiver and the second receiver include radio frequency (RF) and intermediate frequency (IF) amplifiers and filters, as appropriate. The received spread-spectrum signal and the phased version of the o spread-spectrum signal may be digitized.

The delaying means, shown in FIG. 1 as a delay device 13, can delay the received spread-spectrum signal with respect to the phase version of the spread-spectrum signal by a delay. The received spread-spectrum signal consequently becomes a delayed signal, with the delay approximately equal to a delay of the phased version of the spread-spectrum signal. A preferred embodiment employs digital signal processing. Accordingly, the delaying means would include a digital delay device such as a shift register. Alternatively, analog circuitry would employ an analog delay device, or a phase shifter.

Although illustrated with two antennas, the receiving means may include additional antennas for enhanced performance. The delaying means would have appropriate delaying circuits to accommodate the multiple antennas.

The combining means, shown in FIG. 1 as a combiner 14, combines the delayed signal and the phased version of the spread-spectrum signal as a combined signal. The delayed signal and the phased version of the spread-spectrum signal have approximately the same phase or time delay. Thus, an in-phase component of the delayed signal combines with an in-phase component of the phased version of the spread-spectrum signal, and a quadrature-phase component of the phased version of the spread-spectrum signal.

The despreading means despreads the combined signal as a despread signal. This may be accomplished using a product detector with a chipping sequence matched to the received spread-spectrum signal, or a matched filter such as a surface acoustic wave (SAW) device having an impulse function matched to the chipping sequence of the received spread-spectrum signal. Product detectors, digital signal processors and SAW devices for despreading spread-spectrum signals are well known in the art.

The generating means generates a magnitude value from the despread signal. The magnitude value may be an absolute value, the square of the in-phase component and quadrature-phase component of the despread signal, or other metric of the despread signal for determining a relative signal strength value. A magnitude value currently being generated by the generating means is referred to herein as a present-magnitude value. A magnitude value previously generated by the generating means is referred to herein as a previous-magnitude value. The invention is taught with the previous-magnitude value being generated just before the present-magnitude value, although a previous-magnitude value may be separated in time and other magnitude values from the present magnitude value. Also, more than one previous-magnitude value may be used. The concept of the present invention is taught with one previous-magnitude value.

The storing means stores the previous-magnitude value previously generated by the generating means and the present-magnitude value presently generated by the generating means. In a digital implementation, the storing means might be embodied as a shift register or, equivalently, as gates for performing the storing function. In an analog implementation, the storing means might be embodied as two or more capacitors for storing the previous-magnitude value and the present-magnitude value.

The previous-magnitude value and the present-magnitude value are compared by the comparing means. In response to this comparison, the comparing means outputs a comparison signal. The comparing means, for example, may output a comparison signal to increase the delay of the delaying means, if the present-magnitude value were greater than the previous-magnitude value; conversely, the comparing means may output a comparison signal to decrease the delay of delaying means, if the present-magnitude value were less than the previous-magnitude value. The delaying means changes the first delay based on the comparison signal. If a plurality of previous-magnitude values were used, then a scheme may be implemented with the comparing means to weight the plurality of previous-magnitude values.

Figure 3:
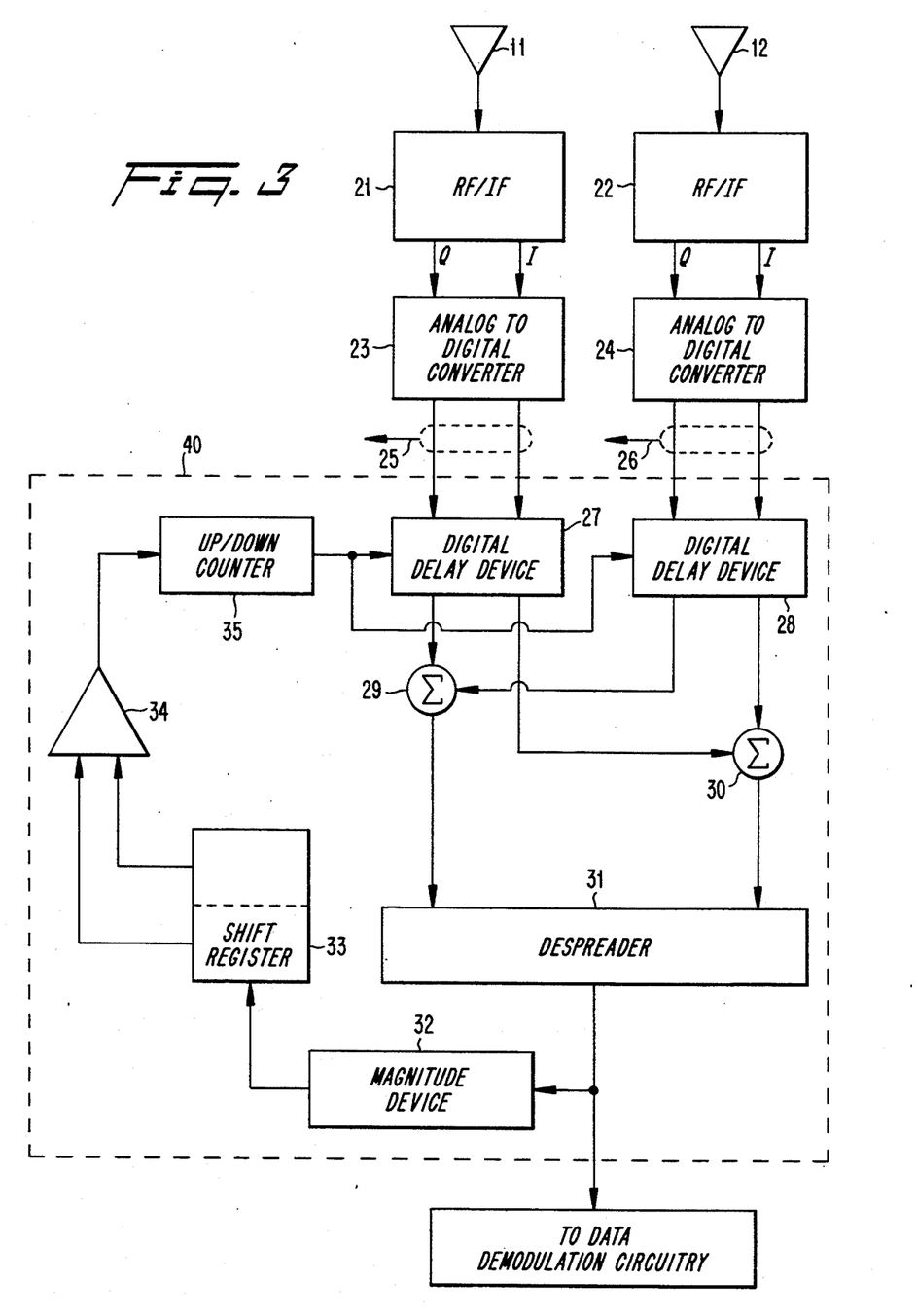
FIG. 3 is a block diagram for adjusting a phase between two receivers.

In the exemplary arrangement shown in FIG. 3, the receiving means is embodied as the first antenna 11, a first RF/IF section 21, a first analog-to-digital converter 23, the second antenna 12, a second RF/IF section 22, and a second analog-to-digital converter 24. The first RF/IF section 21 is coupled between the first antenna 11 and the first analog-to-digital converter 23. The second RF/IF section 22 is coupled between the second antenna 12 and the second analog-to-digital converter 24. Typically, the first RF/IF section 11 generates an in-phase component and a quadrature-phase component of the received spread-spectrum signal. The second RF/IF section 12 generates an in-phase component and quadrature-phase component of the phased-version of the spread-spectrum signal.

As illustratively shown in FIG. 3, the outputs of the first analog-to-digital converter 23 and the second analog-to-digital converter 24 may go to other sections for processing different channels of the spread spectrum signal 25, 26.

The delaying means is embodied as a first digital delay 27. The delaying means additionally may include a second digital delay 28. The first digital delay 27 is coupled to the first analog-to-digital converter 23. If a second digital delay 28 were employed, then the second digital delay 28 is coupled to the second analog-to-digital converter 24.

The combining means is embodied as first summer 29 and second summer 30. The first summer 29 is coupled to the first digital-delay device 27 and to the second digital-delay device 28. The second summer 30 is coupled to the first digital-delay device 27 and to the second digital-delay device 28. If the second digital delay device 28 were not employed, then the first summer 29 is coupled to the first digital-delay device 27 and to the second analog-to-digital converter 24, and the second summer 30 is coupled to the first digital-delay device 27 and to the second analog-to-digital converter 24.

The despreading means is embodied as a despreader 31. The despreader may be embodied as a product device coupled to an appropriate chipping-sequence generator and synchronization circuitry for despreading the received spread spectrum signal. Alternatively, the despreader 31 may be a digital signal processor which includes the appropriate product devices, or a matched filter having an impulse response matched to the chipping sequence of the received spread spectrum signal. As is well known in the art, a surface acoustic wave (SAW) device may be employed having an impulse response matched to the chipping sequence.

The generating means is embodied as a magnitude device 32. The magnitude device 32 is coupled to the despreader 31. Normally, the despreader 31 is coupled to additional circuitry for demodulating data embedded in the received spread spectrum signal.

The storing means is embodied as a shift register 33. The shift register 33 is coupled to the magnitude device 32. The storing means alternatively may be embodied as a plurality of gates, registers, or other circuitry for storing magnitude values.

The comparing means may be embodied as a comparator 34 and an up/down counter 35. The comparator 34 typically has two inputs coupled to the shift register 33. The up/down counter 35 is coupled to the output of the comparator 34 and to the first digital-delay device 27 and/or the second digital-delay device 28.

The first antenna 11 receives the spread-spectrum signal which is amplified by the first RF/IF section 21. The first RF/IF section 21 outputs an in-phase component and a quadrature-phase component to the first analog-to-digital converter 23. The first analog-to-digital converter 23 converts the in-phase component and the quadrature-phase component to a digitized in-phase component and a digitized quadrature-phase component. These components may be processed by modules similar to the phase compensation circuitry 40, by coupling to the outputs of first analog-to-digital converter 23 at the outputs 25.

Similarly, a phased version of the spread-spectrum signal is received by the second antenna 12 and amplified and filtered by the second RF/IF section 22. The second RF/IF section 22 has outputs for an in-phase component and a quadrature-phase component which are fed to the second analog-to-digital converter 24. The outputs 26 of the second analog-to-digital converter can go to modules similar to the phase compensation circuitry 40 for processing different chipping sequences. For example, a spread spectrum may have a plurality of spread-spectrum channels, with each spread-spectrum channel defined by a different chipping sequence. Accordingly, each module 40 would be used for a corresponding spread-spectrum channel, for processing with that particular chipping sequence.

The first digital-delay device 27 delays the digitized spread-spectrum signal by a first delay. The output of the first digital-delay device 27 is the first delayed signal. The second digital-delay device 28 delays the digitized phased version of the spread-spectrum signal by a second delay. The output of the second digital-delay device 28 is a second delayed signal. The second digital-delay device 28 is optional, and is not required for use of the present invention. If the second digital-delay device 28 were not employed, then the term "second delayed signal" refers to the digitized phased version of the spread-spectrum signal, outputted from the second analog-to-digital converter 24.

The first summer 29 combines the quadrature-phase components of the first delayed signal from the first digital-delay device 27, with the second delayed signal from the second digital-delay device 28. The output of the first summer 29 is a first combined signal.

The second summer 30 combines an in-phase component from the first digital-delay device 27, with an in-phase component from the second digital-delay device 28. Accordingly, the in-phase components of the first delayed signal and the second delayed signal are combined as a second combined signal.

The despreading device 31 despreads the first combined signal and the second combined signal as a despread quadrature-phase signal and a despread in-phase signal, respectively. The despread in-phase signal and the despread quadrature-phase signal can be processed by further processing devices, not shown, for demodulating data embedded in the received spread-spectrum signal.

The magnitude device 32 generates a magnitude value from the despread in-phase signal and the despread quadrature-phase signal. The magnitude value may be an absolute value determined from the despread in-phase signal and the despread quadrature-phase signal, or a square of the despread in-phase signal plus a square of the despread quadrature-phase signal. Other metrics may be used for accomplishing the same function of determining a relative signal strength value. The function of the magnitude value is to compare the signal strength of a present-magnitude value with a previous-magnitude value.

The shift register 33 stores the previous-magnitude value and the present-magnitude value in order that a comparison may be made by the comparator 34. The comparator 34, when comparing the previous-magnitude value with the present-magnitude value, outputs a comparison signal. The comparison signal can control the up/down counter 35 to increase or decrease a delay of the first digital-delay device 27. Optionally, the up/down counter 35 may increase or decrease a second delay of the second digital-delay device 28.

The present invention also includes a method for maximizing signal strength of a spread-spectrum signal with multipath comprising the steps of receiving the spread-spectrum signal and a phased version of the spread-spectrum signal. The in-phase and quadrature-phase components of the received spread-spectrum signal are delayed with respect to the in-phase and quadrature-phase components of the phased version of the spread-spectrum signal by a delay, to generate a delayed signal. The in-phase component and the quadrature-phase component of the delayed signal and the phased version of the spread-spectrum signal are combined, respectively, as the in-phase component and quadrature-phase component of a combined signal, and the combined signal is despread as in-phase and quadrature-phase components of a despread signal.

The method includes generating a magnitude value from the in-phase component and the quadrature-phase component of the despread signal, and storing a previous-magnitude value and a present-magnitude value. The previous-magnitude value and the present-magnitude value are compared, and a comparison signal is output based on this comparison. Using the comparison signal, the delay is changed.

In use, the phased array spread-spectrum system and method may be used at a base station or a remote unit. A spread-spectrum signal being received by the phased array spread spectrum system and method is received by the first antenna 11 and the second antenna 12, processed by the first and second RF/IF sections 21, 22, and converted to a digital form by first analog-to-digital converter 23 and second analog-to-digital converter 24. Preferably, digital signal processing is used and may be embodied in an application specific integrated circuit (ASIC). The digitized spread-spectrum signal from the first analog-to-digital converter 23 is preferably delayed with respect to the digitized phased version of the spread-spectrum signal from the second analog-to-digital converter 24. The first digital-delay device 27 is adjusted by up/down counter 35 until the phased and/or time delay between the digitized spread-spectrum signal, and the digitized phased version of the spread-spectrum signal, are more closely aligned. The alignment accrues due to the variations of the up/down counter 35 in response to comparisons by comparator 34 of a previous-magnitude value and a present-magnitude value stored in register 33.

Thus, the spread-spectrum signal and a phased version of the spread-spectrum signal are received, processed to an intermediate frequency or base band and digitized. In-phase and quadrature-phase components are used and delayed and added. The resulting in-phase component and quadrature-phase component are then despread. The magnitude of the despread spread-spectrum signal is then taken and this represents the power or signal strength of the desired signal. The present-magnitude value and the previous-magnitude value are inputted to the shift register 33 and compared by comparator 34. The comparator 34 tells the up/down counter 35 to count as an increase or decrease, i.e., up or down, thereby controlling the delay. Thus, an increase in count might increase the delay, whereas a decrease in count would decrease the delay. Various control algorithms may be used with the up/down counter 35, for more efficiency.

The phased array spread-spectrum system steers an antenna beam formed by the first antenna 11 and a second antenna 12 in the direction of the strongest multipath. This function can be performed continually, thus always looking for the optimal multipath. This beam steering can be done at a base station and at an handset, i.e, a remote subscriber unit.

It will be apparent to those skilled in the art that various modifications can be made to the phased array spread spectrum system and method of the instant invention without departing from the scope or spirit of the invention, and it is intended that the present invention cover modifications and variations of the phased array spread spectrum system and method provided they come within the scope of the appended claims and their equivalents.

I claim:

1. A remote subscriber unit comprising:
    a first antenna for receiving a spread-spectrum signal;
    a first analog-to-digital converter, electrically coupled to said first antenna, for digitizing the received spread-spectrum signal;
    a first digital-delay device, electrically coupled to said first analog-to-digital converter, for delaying the digitized-spread-spectrum signal by a first time delay, thereby generating a first delayed signal;
    a second antenna for receiving a phased version of the spread-spectrum signal;
    a second analog-to-digital converter, electrically coupled to said second antenna, for digitizing the phased version of the spread-spectrum signal;
    a second digital-delay device, electrically coupled to said second analog-to-digital converter, for delaying the digitized phased version of the spread-spectrum signal by a second time delay, thereby generating a second delayed signal;
    a first summer, electrically coupled to said first digital-delay device and to said second digital-delay device, for combining quadrature-phase components of the first delayed signal and the second delayed signal, as a first combined signal;
    a second summer, electrically coupled to said first digital-delay device and to said second digital-delay device, for combining in-phase components of the first delayed signal and the second delayed signal, as a second combined signal;
    a despreading device, electrically coupled to said first summer and to said second summer, for despreading the first combined signal and the second combined signal, as a despread quadrature-phase signal and a despread in-phase signal, respectively;
    a magnitude device, electrically coupled to said despreading device, for generating a magnitude value of the despread in-phase signal and the despread quadrature-phase signal;
    a shift register, electrically coupled to said magnitude device, for storing a previous-magnitude value and a present-magnitude value;
    a comparator, having at least two inputs, electrically coupled to said shift register, and responsive to comparing the previous-magnitude value with the present-magnitude value, for generating a comparison signal; and
    a counter, electrically coupled to said comparator and to said first digital-delay device and to said second digital-delay device, responsive to the comparison signal, for changing the first time delay of said first digital-delay device.

2. The remote subscriber unit as set forth in claim 1 wherein said counter, in response to the comparison signal, changes the second time delay of said second digital-delay device.

3. A phased array spread-spectrum system comprising:
    means for receiving a spread-spectrum signal and a phased version of the spread-spectrum signal;
    means for delaying the spread-spectrum signal with respect to the phased version of the spread-spectrum signal by a time delay, thereby generating a delayed signal;

means for combining the delayed signal and the phased version of the spread-spectrum signal, as a combined signal;

means for despreading the combined signal as a despread signal;

means for generating a magnitude value of the despread signal;

means for storing a previous-magnitude value and a present-magnitude value generated from said generating means; and means for comparing the previous-magnitude value with the present-magnitude value, and for outputting a comparison signal, with said delaying means responsive to the comparison signal for changing the time delay.

4. The phased array spread-spectrum system as set forth in claim 3, wherein said receiving means includes:
a first antenna for receiving the spread-spectrum signal;
a first analog-to-digital converter, electrically coupled to said first antenna, for digitizing the spread-spectrum signal;
a second antenna for receiving the phased version of the spread-spectrum signal; and
a second analog-to-digital converter, electrically coupled to said second antenna, for digitizing the phased version of the spread-spectrum signal.

5. The phased array spread-spectrum system as set forth in claim 3, wherein said delaying means includes a digital-delay device, electrically coupled to said receiving means, for delaying the phased version of the spread-spectrum signal by a second time delay, thereby generating a second delayed signal.

6. The phased array spread-spectrum system as set forth in claim 3, wherein said delaying means includes:
a first digital-delay device, electrically coupled to said receiving means, for delaying the spread-spectrum signal by a first time delay, thereby generating a first delayed signal;
a second digital-delay device, electrically coupled to said receiving means, for delaying the phased version of the spread-spectrum signal by a second time delay, thereby generating a second delayed signal; and
wherein said combining means combines the first delayed signal and the second delayed signal as the combined signal.

7. The phased array spread-spectrum system as set forth in claim 6, wherein said combining means includes:
a first summer, operatively coupled to said delaying means, for combining quadrature-phase components of the delayed signal and of the phased version of the spread spectrum signal, as a first combined signal;
a second summer, operatively coupled to said delaying means, for combining in-phase components of the delayed signal and of the phased version of the spread spectrum signal, as a second combined signal;
wherein said despreading means despreads the first combined signal and the second combined signal as a first despread signal and as a second despread signal, respectively; and
wherein said generating means generates the magnitude value from the first despread signal and the second despread signal.

8. The phased array spread-spectrum system as set forth in claim 7, wherein said despreading means includes a despreading device, electrically coupled to said first summer and to said second summer, for despreading the first combined signal and the second combined signal, as a despread quadrature-phase signal and a despread in-phase signal, respectively.

9. The phased array spread-spectrum system as set forth in claim 8, wherein said generating means includes a magnitude device, electrically coupled to said despreading device, for generating a magnitude value from the despread in-phase signal and the despread quadrature-phase signal.

10. The phased array spread-spectrum system as set forth in claim 9, wherein said comparing means includes:
a comparator, having at least two inputs coupled to a shift register, and responsive to comparing the previous-magnitude value with the present-magnitude value, for outputting the comparison signal; and
a counter, electrically coupled to said comparator and to said first digital-delay device and to said second digital-delay device, responsive to the comparison signal, for changing the first time delay of said first digital delay device.

11. The phased array spread-spectrum system as set forth in claim 3, wherein said despreading means includes a despreading device, electrically coupled to said combining means, for despreading the combined signal as the despread signal.

12. The phased array spread-spectrum system as set forth in claim 3, wherein said generating means includes a magnitude device, electrically coupled to said despreading means, for generating the magnitude value of the despread signal.

13. The phased array spread-spectrum system as set forth in claim 3, wherein said storing means includes a shift register, electrically coupled to said generating means, for storing the previous-magnitude value and the present-magnitude value.

14. The phased array spread-spectrum system as set forth in claim 3, wherein said comparing means includes:
a comparator, having at least two inputs coupled to said storing means, and responsive to comparing the previous-magnitude value with the present-magnitude value, for outputting the comparison signal; and
a counter, electrically coupled to said comparator and to said delaying means, responsive to the comparison signal, for changing the time delay of said delaying means.

15. A method for receiving a spread-spectrum signal comprising the steps of:
receiving a spread-spectrum signal;
receiving a phased version of the spread-spectrum signal;
delaying at least the spread-spectrum signal with respect to the phased version of the spread-spectrum signal by a time delay, thereby generating a delayed signal;
combining the delayed signal and the phased version of the spread-spectrum signal, as a combined signal;
despreading the combined signal as a despread signal;
generating a magnitude value of the despread signal;
storing the magnitude value as a present-magnitude value;

comparing a previous-magnitude value with the present-magnitude value;

outputting, in response to comparing the previous-magnitude value with the present-magnitude value, a comparison signal; and changing, in response to the comparison signal, the time delay.

16. A phased array spread spectrum system comprising:

a first antenna for receiving a spread-spectrum signal;

a first analog-to-digital converter, electrically coupled to said first antenna, for digitizing the received spread-spectrum signal;

a digital-delay device, operatively coupled to said first analog-to-digital converter, for delaying the digitized spread-spectrum signal by a time delay, thereby generating a delayed signal, with the time delay approximately equal to a delay of a phased version of the spread-spectrum signal;

a second antenna for receiving the phased version of the spread-spectrum signal;

a second analog-to-digital converter, electrically coupled to said second antenna, for digitizing the phased version of the spread-spectrum signal;

a first summer, electrically coupled to said digital-delay device and to said second analog-to-digital converter, for combining quadrature-phase components of the delayed signal and quadrature-phase components of the digitized phased version of the spread-spectrum signal, as a first combined signal;

a second summer, electrically coupled to said digital-delay device and to said second analog-to-digital converter, for combining in-phase components of the delayed signal and in-phase components of the digitized phased version of the spread-spectrum signal, as a second combined signal;

a despreading device, operatively coupled to said first summer and to said second summer, for despreading the first combined signal and the second combined signal, as a despread quadrature-phase signal and a despread in-phase signal, respectively;

a magnitude device, electrically coupled to said despreading device, for generating a magnitude value of the despread in-phase signal and the despread quadrature-signal;

a shift register, electrically coupled to said magnitude device, for storing a previous-magnitude value and a present-magnitude value;

a comparator, having at least two inputs, electrically coupled to said shift register, and responsive to comparing the previous-magnitude value with the present-magnitude value, for generating a comparison signal; and a counter, electrically coupled to said comparator and to said digital-delay device, responsive to the comparison signal, for changing the time delay of said digital-delay device.

17. A phased array spread-spectrum system comprising:

means for receiving a spread-spectrum signal and a phased version of the spread-spectrum signal;

means for delaying the spread-spectrum signal with respect to the phased version of the spread-spectrum signal by a time delay, thereby generating a delayed signal;

first means for combining quadrature-phase components of the delayed signal and quadrature-phase components of the phased version of the spread-spectrum signal, as a first combined signal;

second means for combining in-phase components of the delayed signal and in-phase components of the phased version of the spread-spectrum signal, as a second combined signal;

means for despreading the first combined signal and the second combined signal as a despread quadrature-phase signal and a despread in-phase signal, respectively;

means for generating a magnitude value of the despread quadrature-phase signal and the despread in-phase signal;

means for storing a previous-magnitude value and a present-magnitude value generated from said generating means; and means for comparing the previous-magnitude value with the present-magnitude value, and for outputting a comparison signal, with said delaying means responsive to the comparison signal for changing the time delay.

18. The phased array spread-spectrum system as set forth in claim 17, wherein said receiving means includes:

a first antenna for receiving the spread-spectrum signal;

a first analog-to-digital converter, electrically coupled to said first antenna, for digitizing the spread-spectrum signal;

a second antenna for receiving the phased version of the spread-spectrum signal; and a second analog-to-digital converter, electrically coupled to said second antenna, for digitizing the phased version of the spread-spectrum signal.

19. The phased array spread-spectrum system as set forth in claim 17, wherein said delaying means includes a digital-delay device, electrically coupled to said receiving means, for delaying the phased version of the spread-spectrum signal by a second time delay, thereby generating a second delayed signal.

20. The phased array spread-spectrum system as set forth in claim 17, wherein said delaying means includes:

a first digital-delay device, electrically coupled to said receiving means, for delaying the spread-spectrum signal by a first time delay, thereby generating a first delayed signal;

a second digital-delay device, electrically coupled to said receiving means, for delaying the phased version of the spread-spectrum signal by a second time delay, thereby generating a second delayed signal;

wherein said first combining means combines the quadrature-phase components of the first delayed signal and the quadrature-phase components of the second delayed signal as the first combined signal; and said second combining means combines the in-phase components of the first delayed signal and the in-phase components of the second delayed signal as the second combined signal.

21. The phased array spread-spectrum system as set forth in claim 20, wherein said first combining means includes a first summer, electrically coupled to said delaying means, for combining quadrature-phase components of the delayed signal and of the phased version of the spread spectrum signal, as the first combined signal; and said second combining means includes a second summer, electrically coupled to said delaying means, for combining in-phase components of the delayed signal and of the phased version of the spread spectrum signal, as the second combined signal.

22. The phased array spread-spectrum system as set forth in claim 21, wherein said despreading means includes a despreading device, electrically coupled to said first summer and to said second summer, for despreading the first combined signal and the second combined signal as the despread quadrature-phase signal and the despread in-phase signal, respectively.

23. The phased array spread-spectrum system as set forth in claim 22, wherein said generating means includes a magnitude device, electrically coupled to said despreading device, for generating a magnitude value from the despread in-phase signal and the despread quadrature-phase signal.

24. The phased array spread-spectrum system as set forth in claim 23, wherein said comparing means includes:
a comparator, having at least two inputs electrically coupled to a shift register, and responsive to comparing the previous-magnitude value with the present-magnitude value, for outputting the comparison signal; and
a counter, electrically coupled to said comparator and to said first digital-delay device and to said second digital delay device, responsive to the comparison signal, for changing the first time delay of said first digital delay device.

25. The phased array spread-spectrum system as set forth in claim 17, wherein said despreading means includes a despreading device, electrically coupled to said first combining means and to said second combining means, for despreading the first combined signal and the second combined signal as the despread quadrature-phase signal and the despread in-phase signal, respectively.

26. The phased array spread-spectrum system as set forth in claim 17, wherein said generating means includes a magnitude device, electrically coupled to said despreading means, for generating the magnitude value of the despread signal.

27. The phased array spread-spectrum system as set forth in claim 17, wherein said storing means includes a shift register, electrically coupled to said generating means, for storing the previous-magnitude value and the present-magnitude value.

28. The phased array spread-spectrum system as set forth in claim 17, wherein said comparing means includes:
a comparator, having at least two inputs electrically coupled to said storing means, and responsive to comparing the previous-magnitude value with the present-magnitude value, for outputting the comparison signal; and
a counter, electrically coupled to said comparator and to said delaying means, responsive to the comparison signal, for changing the time delay of said delaying means.

29. A method for receiving a spread-spectrum signal comprising the steps of:
receiving a spread-spectrum signal;
receiving a phased version of the spread-spectrum signal;
delaying at least the spread-spectrum signal with respect to the phased version of the spread-spectrum signal by a time delay, thereby generating a delayed signal;
combining the quadrature-phase components of the delayed signal and the quadrature-phase components of the phased version of the spread-spectrum signal, as a first combined signal;
combining the in-phase components of the delayed signal and the in-phase components of the phased version of the spread-spectrum signal, as a second combined signal;
despreading the first combined signal as a despread quadrature-phase signal;
despreading the second combined signal as a despread in-phase signal;
generating a magnitude value of the despread quadrature-phase signal and the despread in-phase signal;
storing the magnitude value as a present-magnitude value;
comparing a previous-magnitude value with the present-magnitude value;
outputting, in response to comparing the previous-magnitude value with the present-magnitude value, a comparison signal; and
changing, in response to the comparison signal, the time delay.

* * * * *

UNITED STATES PATENT AND TRADEMARK OFFICE
CERTIFICATE OF CORRECTION

PATENT NO. : 5,422,908
DATED : June 6, 1995
INVENTOR(S) : Donald L. Schilling

It is certified that error appears in the above-identified patent and that said Letters Patent is hereby corrected as shown below:

Column 3, Line 62: before "phased version" insert --delayed signal combines with a quadrature-phase component of the--

Column 8, line 39: delete "in,phase" and insert --in-phase--.

Column 9, line 52: delete "operatively" and insert --electrically--; and
line 57: delete "operatively" and insert --electrically--.

Column 11, line 14: delete "operatively" and insert --electrically--; and
line 37: delete "operatively" and insert --electrically--.

Signed and Sealed this

Twenty-eighth Day of January, 1997

Attest:

BRUCE LEHMAN

Attesting Officer    Commissioner of Patents and Trademarks